United States Patent
Conner

[11] 3,722,918
[45] Mar. 27, 1973

[54] ANTI-JACKNIFING DEVICE FOR TRACTOR-TRAILER TRUCKS

[76] Inventor: Elmer W. Conner, 207 East Fremont, Medicine Lodge, Kans. 67104

[22] Filed: June 23, 1971

[21] Appl. No.: 155,911

[52] U.S. Cl. ............................. 280/432, B62d/53/08
[58] Field of Search ............................ 280/432

[56] References Cited

UNITED STATES PATENTS

| 2,499,013 | 2/1950 | Wood | 280/432 |
|---|---|---|---|
| 2,130,004 | 9/1938 | Fusetti et al. | 280/432 |
| 2,188,727 | 1/1940 | Soulis | 280/432 |
| 3,507,517 | 4/1970 | Eagle | 280/432 |
| 2,468,705 | 4/1949 | Price | 280/432 |
| 3,393,923 | 7/1968 | Rendessy | 280/432 |

Primary Examiner—Leo Friaglia
Attorney—Arnold B. Christen et al.

[57] ABSTRACT

An anti-jacknifing device for tractor-trailer trucks which includes braking means mounted on the fifth wheel of the tractor and a vertical arcuate skirt mounted on the under surface of the trailer, concentrically with the kingpin. The braking means define an arcuate gap having the same radius as the skirt and which partially surrounds the vertical skirt, and brake pads arranged on both sides of the gap can simultaneously engage the vertical skirt to effectively prevent a jacknifing movement of the trailer.

14 Claims, 8 Drawing Figures

Patented March 27, 1973  3,722,918

INVENTOR
ELMER W. CONNER
BY Christen and Sabol
ATTORNEYS

Patented March 27, 1973

ANTI-JACKNIFING DEVICE FOR TRACTOR-TRAILER TRUCKS

The present invention relates to an anti-jacknifing device for tractor-trailer trucks, and more particularly to an anti-jacknifing device for use with fifth wheel couplings on tractor-trailer trucks.

It is known that the relative "jacknife" movement between the tractor and the trailer of an articulated vehicle is liable to occur during application of the vehicle road wheel brakes. This dangerous phenomenon of jacknifing occurs most commonly when braking on a wet or greasy road surface, and results in a continued inertial movement of the trailer in one direction after the tractor has either altered its direction of movement or come to a stop. This continued inertial movement may be the cause not only of damages to the trailer truck and goods being hauled, but also may cause serious damage or injury to other vehicles and persons.

Therefore several attempts have been made to solve this problem.

For example, U.S. Pat. No. 3,005,643 shows a device for preventing a jacknife movement of a tractor-trailer truck, which comprises a horizontal disk located in a housing secured to the tractor. This disk can be fixedly connected to the under surface of the trailer by means of a drawbar and a yoke which clamps the upper part of the disk means provided with a V-shaped slot, so that the disk follows the oscillating rotary movement of the trailer with respect to the tractor. A plurality of floating shoes are arranged within the housing and are adapted to engage the outer circular surface of the disk to prevent the rotary movement thereof when suitable actuating means are operated. One drawback of this device is that it can only be used in connection with especially built tractors and trailers and cannot be adapted to the conventional fifth wheel already installed on a tractor-trailer truck.

United States Pat. No. 3,328,051 shows anti-jacknife device which can be used in conjunction with a conventional fifth wheel. A coupling pin which is non-rotatably engaged with this fifth wheel is journalled in the bottom part of the trailer and extends into the interior thereof. A braking disk is fixedly mounted on the coupling pin, in the interior of the trailer, and is adapted to be engaged by brake shoes acting on its flat surfaces, upon operation of suitable actuating means. One drawback of this known device consists in that the coupling pin has to transmit all the torque produced by the weight of the trailer. This requires a stronger pin than in usual fifth wheel assemblies and, consequently, also requires changes in the fifth wheel itself. In addition, the braking disk means located within the trailer results in less available loading space in the trailer.

United States Pat. No. 3,507,517 shows a tractor-trailer anti-jacknifing device which can be used in conjunction with conventional fifth wheel coupling means. It comprises an arcuate rail portion fixedly secured to the under surface of the trailer and a buffer-like brake shoe fixedly mounted on the chassis at the rear of the tractor and adapted to engage one surface of the rail when suitable operating means are actuated. A drawback of this known device is that it can only be used with mating tractors and trailers, since the chassis of different tractors are not all standardized, thus resulting in different arrangements of the rail and the brake shoe with respect to each other. It is common practice, however, to utilize a tractor with different trailers, and vice versa, since the fifth wheel coupling means are standardized. This practice is only possible to a limited extend with this anti-jacknifing device. Another drawback resides in the fact that the large rail surrounds the fifth wheel means almost completely, thus preventing an easy approach by an operator to couple the conventional kingpin in a manner such as disclosed, for example, in U.S. Pat. No. 3,002,767. A further drawback of this known anti-jacknifing device is that the arcuate rail will abut the chassis of the tractor at extreme angular positions between tractor and trailer, such as occur during parking or backing operations. In other words, the maneuverability of the truck is reduced by this prior device. Still another drawback consists in that the unilateral pressure on the rail, which results when the brake shoe is actuated, urges the kingpin to unnecessarily load the locking device of the coupling means.

From the aforesaid, it appears that several designs of anti-jacknifing devices have been proposed in the prior art. However, all of them have some basic drawbacks and disadvantages with respect to their application to tractor-trailer trucks.

Therefore, it is an object of the present invention to provide an anti-jacknifing device for tractor-trailer trucks, which effectively prevents the jacknifing phenomena and which does not possess the drawbacks mentioned above.

More particularly, it is an object of the invention to provide an anti-jacknifing device for tractor-trailer trucks, which can be used in connection with standardized fifth-wheel means of new and of already existing tractor-trailer trucks.

It is another object of the invention to provide an anti-jacknifing device for tractor-trailer trucks, which effectively prevents the rotation of the trailer, when the device is operated, without requiring a special kingpin nor affecting the conventional kingpin locking means.

It is another object of the invention to provide an anti-jacknifing device for tractor-trailer trucks, which permits easy access to the coupling means of the fifth wheel and which provides full loading space within the trailer.

A further object of the invention is to provide an anti-jacknifing device for tractor-trailer trucks, which permits full maneuverability of the truck.

A further object of the present invention is to provide an anti-jacknifing device which cooperates with the braking system of the tractor-trailer truck but whose anti-jacknifing action can be independently regulated from the braking action of the truck.

Still another object of the present invention is to provide an anti-jacknifing device of the aforesaid type which is relatively simple in construction and operation and which is easy to install and to maintain.

To realize these objects, an anti-jacknifing device for tractor-trailer trucks, according to the present invention, basically comprises braking means mounted on the fifth wheel which is secured to the tractor, and substantially vertical skirt means defining an arcuate portion of constant radius and mounted on the trailer concentrically with the kingpin which is fixedly secured thereto. In the engaged position of the truck, in which the kingpin engages the fifth wheel to oscillate therein, the skirt means is located in an arcuate gap defined by the braking means, said braking means having an inoperative position separated from the skirt means and an operative position engaging the skirt means.

Further objects and features of the present invention will be best understood and appreciated from the following description of preferred embodiments of the device, selected for purposes of illustration and shown in the accompanying drawings, in which.

Figure 1:
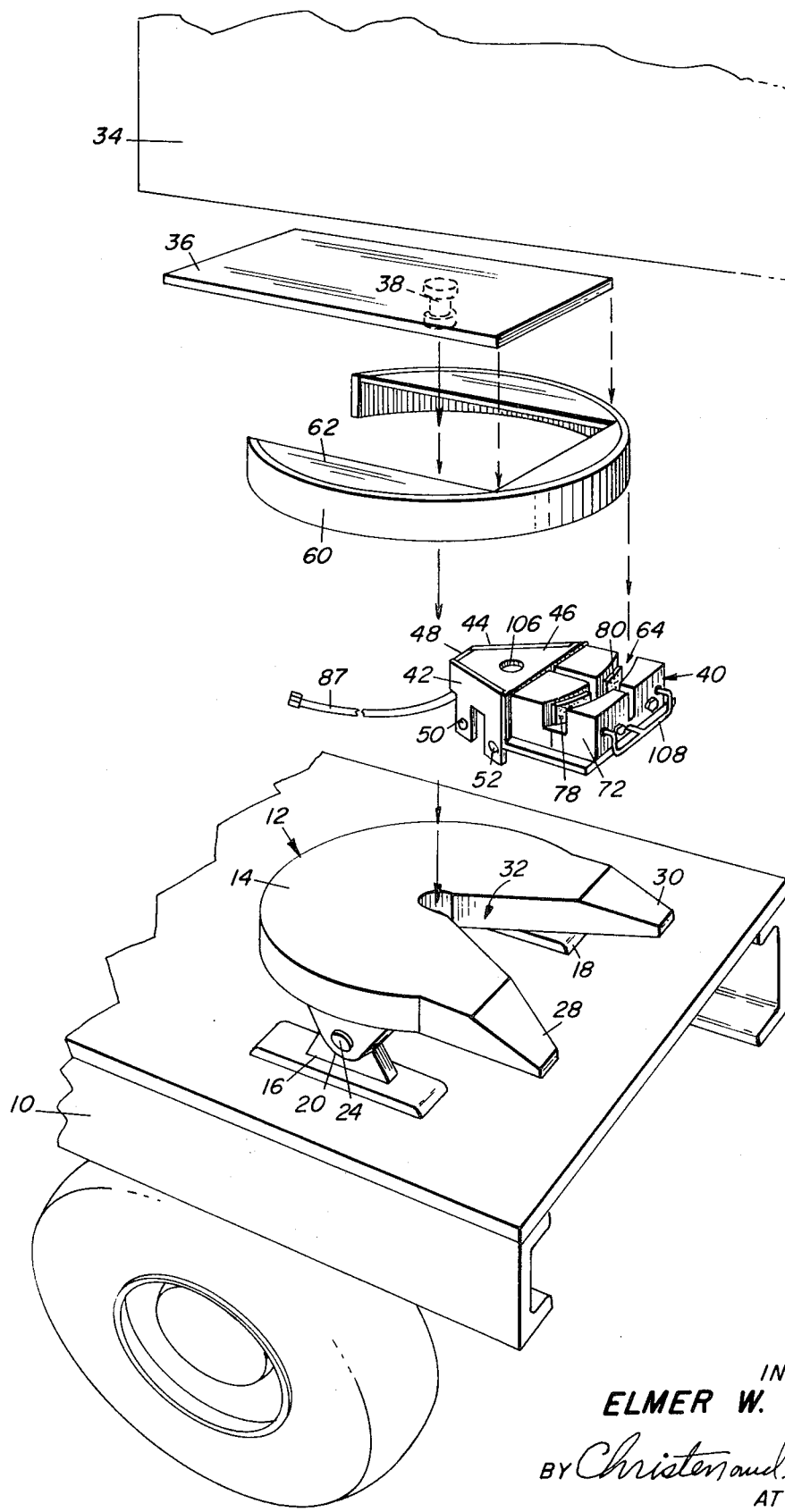
FIG. 1 is a partially broken exploded perspective view of a fifth wheel assembly of a tractor-trailer truck in combination with an anti-jacknifing device, according to the invention.
Figures 2, 3:
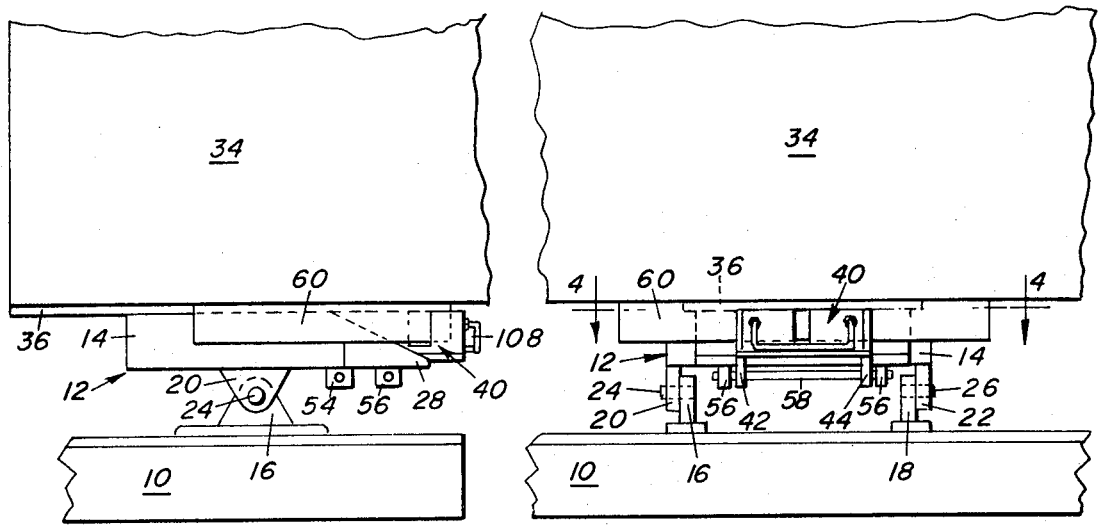
FIG. 2 is a partially broken side elevational view of a tractor-trailer truck in engaged position and provided with the anti-jacknifing device.
FIG. 3 is a rear elevational view of the assembly shown in FIG. 2.

Referring now more particularly to the drawings, FIGS. 1–3 are general views of an anti-jacknifing device embodying the invention. As shown in these figures, a tractor 10 is provided on its rear frame with a conventional fifth wheel assembly, indicated generally by numeral 12, which comprises a generally circular fifth wheel 14 of standardized dimensions. This fifth wheel 14 is pivotally mounted on supports 16, 18, secured to the tractor 10, by means of ears 20, 22, secured to the fifth wheel, and pivot pins 24, 26, respectively. The fifth wheel 14 is provided with two tapered arms 28, 30 extending in rearward direction and defining a generally Y-shaped kingpin slot 32. A trailer 34 is provided on the front part of its under surface with a generally rectangular kingpin plate 36 and with a conventional kingpin 38 mounted on said plate. When the tractor and the trailer are in a disengaged position, said kingpin 38 is separated from said fifth wheel 14. In the engaged position of the tractor and the trailer, the kingpin 38 engages the fifth wheel 14 to oscillate therein and is locked by suitable locking means (not shown), and the kingpin plate 36 engages the upper surface of the fifth wheel 14 and acts as a wear plate.

Figure 5:
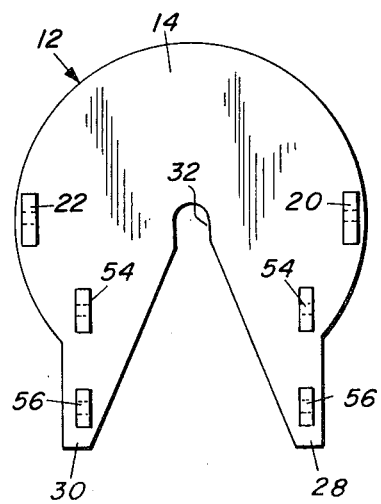
FIG. 5 is a detail view of the under surface of the fifth wheel.

A braking means, indicated generally by numeral 40, is located in the angular portion of the Y-shaped kingpin slot 32 and includes two sidewalls 42, 44 abutting the inner surfaces of tapered arms 28, 30, respectively, a stepped, generally V-shaped, caliper plate 46 affixed to the upper edges of the sidewalls 42 and 44, and a front wall 48 affixed to the sidewalls 42, 44 and to the caliper 46. Each of said sidewalls 42 and 44 is provided with a front opening 50 and a rear opening 52 and each of said tapered arms 28 and 30 is provided with a front bracket 54 and a rear bracket 56 welded to the under surface of said arms (shown in FIG. 5) and provided with respective bores aligned with the corresponding openings in the sidewalls. Respective steel rods 58, provided each with a head at one end and with a perforation at the other end, are passed through each of the front and rear pluralities of openings and bores provided in said sidewalls and said brackets, respectively, and a safety pin (not shown) is inserted in each of said perforations of the steel rods to prevent an undesired movement of said steel rods out of said openings and bores. Thus, it can be appreciated that said braking means 40 is attached to the fifth wheel 14 in a firm but easily removable manner, and that the only adaptation required for the fifth wheel to be used in combination with an anti-jacknifing device according to the invention is the welding of four brackets to its under surface.

A substantially vertical skirt means 60 defining an arcuate portion of constant radius, is mounted on the under surface of trailer 34 concentrically with kingpin 38. This vertical skirt 60 can be made, for example, of a ½ inch thick steel band. A skirt plate 62 provided with a rectangular recess mating with the contour of the kingpin plate 36 and having a circular outer contour of the same radius as skirt 60 is welded to skirt 60 and to the kingpin plate 36, so that the substantially vertical skirt 60 is fixedly attached to the kingpin plate 36. It can be appreciated that no changes are to be made in the trailer 34 and that said recess in the skirt plate 62 can easily be cut to mate with any contour of the kingpin plate 36, thus facilitating the adaptation of the device to already existing tractor-trailer trucks.

Figure 4:
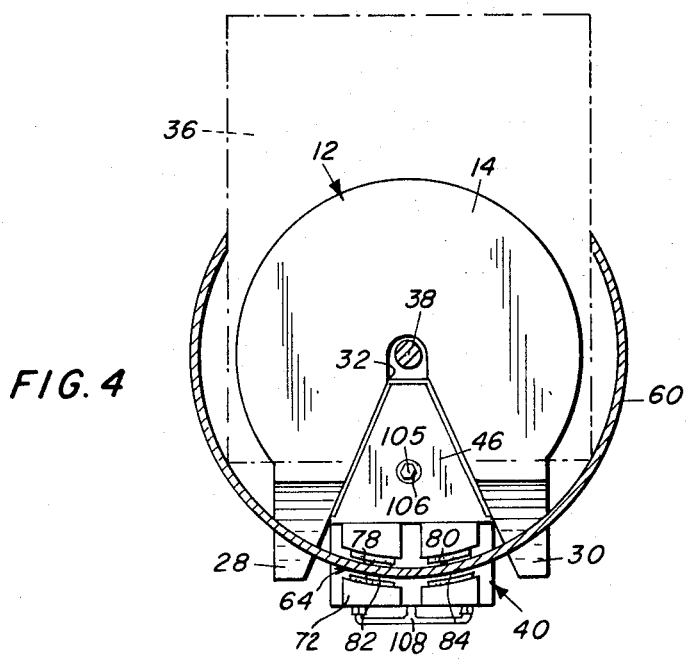
FIG. 4 is a sectional view along line 4—4 in FIG. 3.

The radius of skirt 60 is larger than the radius of the circular portion of the fifth wheel 14, so that the skirt partially surrounds the upper part of the fifth wheel in the engaged position of the tractor-trailer truck, as shown in FIGS. 2 to 4, without hampering, however, access to the coupling means. Said radius is preferably smaller than the length of the tapered arms 28, 30, so that the skirt is located adjacent to the braking means 40.

According to a preferred embodiment of the invention the braking means 40 define an arcuate gap 64 having substantially the same radius as the skirt 60 and being concentric with the fifth wheel, so that the skirt 60 can freely move within the gap 64 and be engaged, simultaneously on its inner and outer surface, by the braking means 40 in the operative position thereof. Thus, it can be appreciated that the braking force to prevent the rotation of the skirt and, consequently, of the trailer, consists in a clamping force applied to the skirt, without exerting any torque, pressure or other kind of stress on the kingpin 38 or on other conventional elements of the tractor-trailer coupling.

Figure 6:
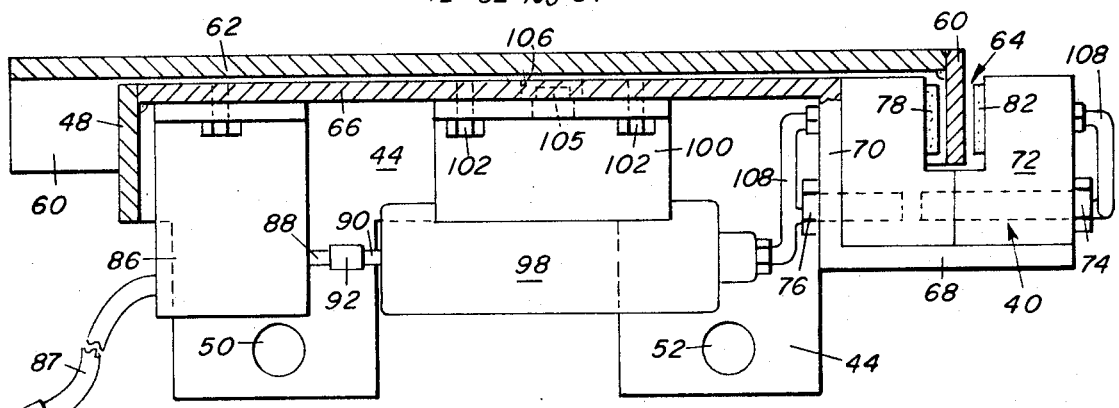
FIG. 6 is a detail view, partially in section, of the anti-jacknifing device, according to the invention.

More particularly, the stepped caliper plate 46 defines a substantially horizontal upper portion 66, a substantially horizontal lower portion 68 and a substantially vertical intermediate portion 70 connecting both said upper and lower portions (as shown in FIG. 6). The upper surface of said upper portion 66 lies in substantially the same plane as the upper surface of the fifth wheel 14, but preferably slightly lower than this plane to avoid friction with the kingpin plate 36 and the skirt plate 62. The shovel-like lower portion 68 carries on its upper surface a generally U-shaped caliper 72 defining a gap 64 and formed of two halves secured to each other by means of bolts 74, while the whole caliper is attached to the intermediate portion 70 of the caliper plate 46 by means of bolts 76. Each one of the halves of the caliper 72 comprises two symmetrical brake pad supports, and four brake pads 78, 80, 82, and 84 are mounted on these supports. Thus, the brake pads are arranged in such a manner that two brake pads, 78 and 80, are located on one side of the gap 64, and the other two brake pads, 82 and 84, are located on the other side of the gap. In addition, each one of the brake pads 78 and 80 lies substantially opposite to one of the brake pads 82 and 84, respectively, to simultaneously act on both the inner and the outer surface of skirt 60.

Figure 7:
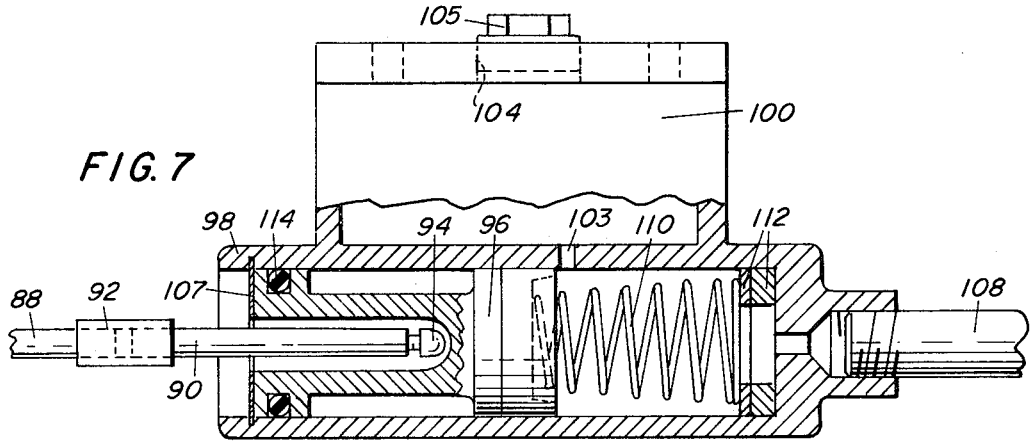
FIG. 7 is a detail view, partially in section, of the master cylinder used to operate the braking means.
Figure 8:
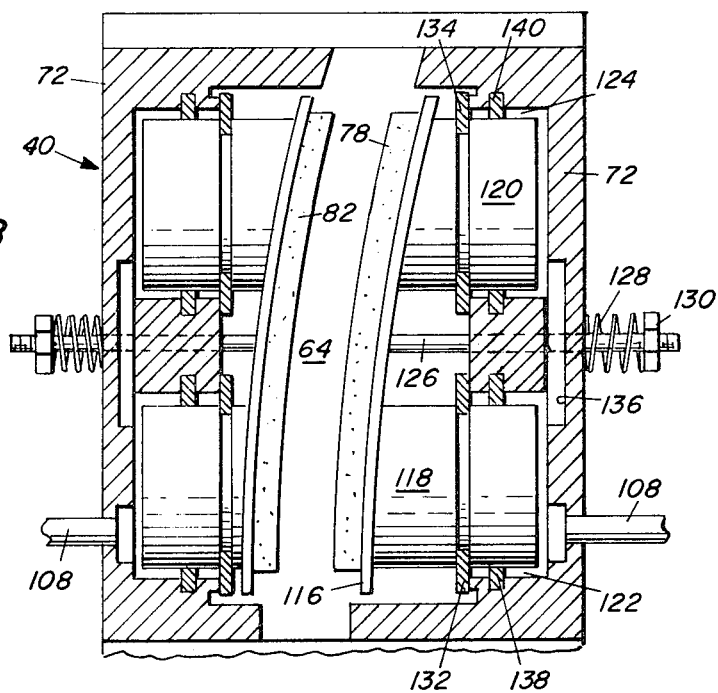
FIG. 8 is a plan view of the braking means broken away to show the interior of the left-hand-portion thereof.

FIGS. 6 - 8 show the means to actuate the brake pads 78 - 84 when, for example, the road wheel brakes of the tractor-trailer truck are operated. A conventional servomotor 86 is mounted on the under surface of the upper portion 66 of the caliper plate 46 to translate the braking action of the truck into a longitudinal movement of push-rod 88. Depending upon the type of brake equipment of the tractor-trailer truck, the servomotor 86, connected with the main braking system of the truck by means of line 87, can be pneumatically, hydraulically or electrically operated to produce said longitudinal movement of push-rod 88. Since servomotors of this type are well known, a more detailed description thereof is not deemed necessary. The connection 87 between the servomotor 86 and the braking means of the truck is detachable to permit a complete separation of the braking means 40 from the tractor when the rods 58 are withdrawn from their respective operative positions. This permits quick and easy substitution of the whole braking means 40, for purposes of servicing.

The push-rod 88 is connected with a second push-rod by means of an adjustable threaded collar 92 to permit a variation of the length of the push-rod means. The free end of push-rod 90 is provided with a semispherical head 94 which is adapted to contact a piston 96 of a master cylinder 98. This master cylinder 98 is fixedly secured to an oil tank 100 which is attached to the under surface of the portion 66 of the caliper plate 46 by means of screws 102, and the tank is connected with the master cylinder through a bore 103. The filler opening 104 to supply fluid into the tank and which is closed by a threaded plug 105 can easily be reached through a circular opening 106 provided in the upper portion 66 of a caliper plate 46. The master cylinder 98 is provided with a wide opening on the side facing the servomotor 86, which is closed by a snap ring 107, and has a narrow opening on the opposite side, which is connected with a pressure duct 108. Inside the cylinder housing a pressure spring 110 which rests on a pair of washers 112 urges the piston 96 toward an inoperative position abutting said snap ring 107 and uncovering the bore 103. In addition, the piston 96 is provided with an O-ring 114 to act as an oil seal.

The pressure duct 108 is subdivided into four branches leading to each of the brake pad supports of the brake pads 78, 80, 82 and 84. Since the structures of all brake pad supports are substantially identical to each other, only one such structure will be described in detail and in connection with FIG. 8. The brake pad 78, formed for example of brake lining material, is fixedly secured to a support plate 116, for example by bonding, which is guided in a substantially rectangular opening of the respective brake pad support of caliper 72. This support plate 116 contacts with its inner surface two pistons 118 and 120 of two secondary cylinders 122 and 124, respectively, defined by the caliper 72, and is urged towards this contact with the pistons by a rod 126 and a spring 128. The rod 126 has a headed end secured to the support plate 116, passes through the caliper 72 and is provided with a thread on its free end protruding from said caliper 72, so that a nut can be adjustably screwed on rod 126 to regulate the pressure of spring 128. On the other side, the pistons 118 and 120 are each provided with a snap ring 132 and 134, respectively, to limit their retractive movement and maintain a gap between the pistons and the rear walls of cylinders 122 and 124. The secondary cylinders 122 and 124 are connected with each other by means of a passage 136 provided in caliper 72, so that the hydraulic fluid supplied by duct 108 flows to both said secondary cylinders which are actuated in parallel. In addition, each of the pistons 118 and 120 is provided with an oil sealing ring 138 and 140, respectively, to reduce oil losses.

In the practical application of the anti-jacknifing device according to the invention, when a trailer provided with a skirt means 60 is to be connected with a tractor provided with a braking means 40, the braking means are first separated from the fifth wheel 14 to clear the kingpin slot 32, if that has not already been done, by removing the two rods 58 that extend through the brackets 54 and 56 and laying down the unit 40 on the tractor frame 10. The trailer and tractor are then coupled in a conventional manner so that the kingpin 38 is located at the innermost portion of kingpin slot 32. Subsequently, the braking means 40 is inserted into the kingpin slot 32, so that the caliper 72 straddles the skirt 60. When the upper surface of caliper plate 46 abuts the kingpin plate 36, the respective openings of the brackets 54 and 56 and of the sidewalls 42 and 44 will be substantially aligned, so that the two rods 58 can easily be inserted therethrough and be secured by corresponding safety pins. To uncouple the tractor and the trailer these operations are carried out in the reverse order.

The anti-jacknifing device according to the invention can either be actuated by an individual unit or, preferably, may be simultaneously actuated with the road wheel braking system. In the latter case, the device will provide free rotational movement of the trailer around the tractor and will only begin to actuate when a certain amount of braking force is applied to the system, to avoid the possibility that blocking of the articulation between tractor and trailer will occur during a slight braking action. For this purpose, the length of push-rods 88 and 90 can be regulated by means of collar 92, so that only after a certain extension of the push-rods the master cylinder will be actuated. In addition, the nuts 130 can also be regulated to provide the rods 126 with a certain pressure which must be overcome by the hydraulic pressure before the anti-jacknifing brake pads are actuated.

In case of an emergency braking, the braking force transmitted to the servomotor 86, will be strong enough to cause the push-rods 88 and 90 to be displaced over the above mentioned limit. Head 94 will contact the piston 96 of the master cylinder 98 and cause it to move against the action of spring 110. During the course of this displacement, the piston 96 will seal off the bore 103 so that a hydraulic pressure will be built up in the master cylinder 98 and transmitted through the duct 108, in parallel, to the eight secondary cylinders actuating in pairs on the brake pads 78 – 84. Thus, the skirt 60 will be simultaneously engaged from both sides by the brake pads and will be prevented from rotating, thus preventing the trailer 34 from jacknifing, or rotating, around the pivot point.

As soon as the braking system is released, the pushrods 88 and 90 will be withdrawn and spring 110 will urge the piston 96 back to its inoperative position. In proportion with the decrease of hydraulic pressure in the secondary cylinders, the springs 128 will urge the brake pads and the pistons 118 and 120 back to their respective inoperative positions, shown in FIG. 8. The bore 103 is opened again, so that any oil losses which might have occurred during the braking operation can be replaced by the oil supply contained in tank 100.

It will be apparent that the described embodiment is for the purpose of illustrating the invention, and that changes and variations may be made by those skilled in the art without departing from the scope of the invention which is defined in the appended claims.

I claim:

1. An anti-jacknifing device for tractor-trailer trucks provided with a fifth wheel secured to the tractor and with a kingpin fixedly secured to the trailer, and having an engaged position in which said kingpin engages said fifth wheel to oscillate therein and a disengaged position in which said kingpin is separated from the fifth wheel, said anti-jacknifing device comprising braking means mounted on said fifth wheel, and substantially vertical skirt means defining an arcuate portion of constant radius and mounted on said trailer concentrically with said kingpin, said braking means including at least two brake pads arranged opposite to each other and defining an arcuate gap having substantially the same radius as said skirt means and being concentric with said fifth wheel, said skirt means being located in said arcuate gap in the engaged position of the kingpin, spring means to urge said brake pads away from the skirt means, and actuating means to simultaneously urge the brake pads away towards the respective opposite sides of the skirt means.

2. An anti-jacknifing device as defined in claim 1, wherein said fifth wheel is provided with two tapered arms extending in rearward direction and defining a generally Y-shaped kingpin slot, wherein a kingpin plate provided with a kingpin is attached to the under surface of said trailer, and wherein in the engaged position of the kingpin, said kingpin plate engages the upper surface of the fifth wheel, said kingpin being located at the innermost portion of said kingpin slot, and the uppermost surface of said braking means lying in substantially the same plane as said upper surface of the fifth wheel.

3. An anti-jacknifing device as defined in claim 2, wherein said braking means is located in the angular portion of said Y-shaped kingpin slot and includes supporting means to detachably connect said braking means to said fifth wheel, and wherein said arcuate skirt means is fixedly attached to said king-pin plate and has a larger radius than the radius of the fifth wheel.

4. An anti-jacknifing device as defined in claim 3, wherein said supporting means includes two sidewalls abutting the inner surfaces of said tapered arms and a stepped generally V-shaped caliper plate affixed to the upper edges of said sidewalls and defining an upper portion, a lower portion and an intermediate portion connecting both said upper and lower portions, said actuating means being secured to the under surface of said upper portion and said brake pads being located on the upper surface of said lower portion.

5. An anti-jacknifing device as defined in claim 4, wherein said sidewalls are each provided with at least two openings, and said supporting means further includes at least two brackets affixed to each under surface of said arms and provided with respective bores aligned with the corresponding openings in the sidewalls, at least two rods being received in said aligned bores and openings to support the braking means with relation to the fifth wheel.

6. An anti-jacknifing device as defined in claim 3, wherein said actuating means includes operating means to connect the main braking system of a truck with said braking means to actuate said brake pads, said operating means comprising a servomotor means detachably connected to the main braking system of a truck, a master cylinder having a piston mechanically connected to said servomotor means, and at least two secondary cylinders hydraulically operated, in parallel, by the piston of said master cylinder and mechanically connected to each one of said brake pads.

7. An anti-jacknifing device as defined in claim 6, wherein said braking means includes four brake pads arranged in groups of two on each side of said arcuate gap, each pad of one group being substantially opposite to a corresponding pad of the other group, and eight secondary cylinders connected in parallel to said master cylinder, each one of said brake pads being actuated by two of said secondary cylinders.

8. An anti-jacknifing device as defined in claim 6, wherein said servomotor means connected to the main braking system of the truck is pneumatically operated.

9. An anti-jacknifing device as defined in claim 6, wherein said servomotor means connected to the main braking system of the truck is hydraulically operated.

10. An anti-jacknifing device as defined in claim 10, wherein said servomotor means connected to the main braking system of the truck is electrically operated.

11. An anti-jacknifing device for tractor-trailers of the type wherein a trailer means is detachably connected with a tractor means by kingpin means for relative swinging movement about a vertical axis, said tractor means including wheel brake operating means including an element movable in one direction when wheel braking force is applied, said trailer means including a braking surface for frictional coaction with braking means on the tractor means to resist said relative swinging movement, said braking means including, a housing, hydraulically operable brake pad means mounted in said housing for movement between operative and inoperative positions, master cylinder means mounted in said housing, means to contain a supply of hydraulic fluid in said housing in communication with said master cylinder and said brake pad means, whereby said brake pad means is moved between said operative and inoperative positions in response to reciprocating movement of the master cylinder, and means to detachably mount said housing on said tractor means and to detachably connect said master cylinder with said movable element of the wheel brake operating means.

12. An anti-jacknfing device as defined in claim 11, wherein said brake pad means includes a pair of oppositely disposed reciprocating pistons movable toward and away from each other between said operative and inoperative positions.

13. An anti-jacknifing device as defined in claim 11, wherein said kingpin means includes fifth wheel means attached to said tractor means, said fifth wheel means being provided with a generally inwardly converging opening, said housing of the braking means being detachably mounted in said opening.

14. An anti-jacknifing device as defined in claim 11, wherein said means to contain a supply of hydraulic fluid includes a tank provided in said housing, and conduit means connecting said master cylinder, said brake pad means and said tank.

* * * * *